(12) United States Patent
Xu

(10) Patent No.: US 9,057,358 B2
(45) Date of Patent: Jun. 16, 2015

(54) WIND TURBINE WITH VARIABLE BLADE PITCH FOR WIND POWER ELECTRICAL GENERATOR

(76) Inventor: Jianxiong Xu, Ningbo (CN)

( * ) Notice: Subject to any disclaimer, the term of this patent is extended or adjusted under 35 U.S.C. 154(b) by 936 days.

(21) Appl. No.: 13/259,149

(22) PCT Filed: Mar. 26, 2010

(86) PCT No.: PCT/CN2010/071342
§ 371 (c)(1),
(2), (4) Date: Sep. 23, 2011

(87) PCT Pub. No.: WO2010/108453
PCT Pub. Date: Sep. 30, 2010

(65) Prior Publication Data
US 2012/0014793 A1 Jan. 19, 2012

(30) Foreign Application Priority Data
Mar. 26, 2009 (CN) .......................... 2009 1 0097206

(51) Int. Cl.
*F03D 7/04* (2006.01)
*F03D 7/02* (2006.01)

(52) U.S. Cl.
CPC ....... *F03D 7/0224* (2013.01); *F05B 2270/1011* (2013.01); *Y02E 10/721* (2013.01); *Y02E 10/723* (2013.01)

(58) Field of Classification Search
CPC ... F03D 7/0224; Y02E 10/723; Y02E 10/721; F05B 2270/1011
USPC .......................................................... 416/43
See application file for complete search history.

(56) References Cited

U.S. PATENT DOCUMENTS

2007/0281558 A1* 12/2007 Jansen et al. ...................... 440/6

FOREIGN PATENT DOCUMENTS

| CN | 101520023 | 9/2009 |
| EP | 0043872 | 1/1982 |
| FR | 2686656 | 7/1993 |
| GB | 2010980 | 7/1979 |

OTHER PUBLICATIONS

International Search Report for PCT Patent Application No. PCT/CN2010/071342.
Cheng Rongxiang, el al. The center main spring centrifugal variation paddle device for wind energy conversion system, Renewable Energy, Jun. 2005, 124 Issue in All, pp. 59-60.

\* cited by examiner

*Primary Examiner* — Nathaniel Wiehe
*Assistant Examiner* — Jeffrey A Brownson

(57) ABSTRACT

The present patent application provides a wind turbine with variable blade pitch. The wind turbine with variable blade pitch includes a turbine shell coaxially disposed at a turbine axis; and at least three evenly distributed blade handle bases fixedly disposed at the outer circumference of the turbine shell. A blade handle axis is coaxially configured on each blade handle base. A blade is fixedly disposed on each blade handle axis. A centrifugal blade pitch changing unit is disposed on the turbine shell and configured to adjust the rotation speed of the wind turbine. When the rotating speed of the wind turbine exceeds the rated rotating speed, it is regulated by the centrifugal blade pitch changing unit, so as to avoid the rotating speed of the wind turbine to be greatly increased due to the wind speed rise and make the wind turbine run stably at the rated rotating speed.

6 Claims, 5 Drawing Sheets

WIND TURBINE WITH VARIABLE BLADE PITCH FOR WIND POWER ELECTRICAL GENERATOR

FIELD OF THE PATENT APPLICATION

The present patent application relates to a wind power electrical generator and more particularly to a wind turbine with variable blade pitch for a wind power electrical generator.

BACKGROUND

The electrical generators currently available in the market mainly include diesel electrical generators, solar power electrical generators, and wind power electrical generators. The wind power electrical generators mainly rely on wind power to rotate the wind turbines so as to generate electrical power. However, once the wind speed is too high, the rotating speed of the wind turbine will increase by a large amount so that the operation of the wind turbine becomes unstable, which may damage the blades, the electrical generator, the control system and etc. As a result, the wind power electrical generator will not be ale to function, and the range of wind speed that is compatible with the wind power electrical generator is limited. To solve the above problem, some wind power electrical generators control the rotation speed of the wind turbine by hydraulic pressure and electronically controlled speed adjustment mechanisms. However, the structures of the wind power electrical generators are relatively complicated and the manufacturing thereof is relatively difficult.

SUMMARY

The technical problem that the present patent application is directed to solve is to provide a wind turbine with variable blade pitch for a wind power electrical generator that works stably under a preset rated wind speed, and has a simple structure and a wide range of compatible wind speed.

To solve the above technical problem, the present patent application provides a wind turbine with variable blade pitch for a wind power electrical generator. The wind turbine with variable blade pitch includes a turbine shell coaxially disposed at a turbine axis; and at least three evenly distributed blade handle bases fixedly disposed at the outer circumference of the turbine shell. A blade handle axis is coaxially configured on each blade handle base. A blade is fixedly disposed on each blade handle axis. A centrifugal blade pitch changing unit is disposed on the turbine shell and configured to adjust the rotation speed of the wind turbine.

The blade pitch changing unit includes a plurality of speed adjustment rods, a speed adjustment spring, and a plurality of adjustment screws, the quantity of the adjustment screws corresponding to the quantity of the blade handle axes. The speed adjustment rods being fixedly disposed on the blade handle axes by a certain angle. The center of gravity of each speed adjustment rod is deviated from the center of the axis of each blade handle axis. A spring fixture dish is fixedly disposed on the turbine shell. A spring push plate being fixedly disposed at an end of the adjustment screw. The other end of the adjustment screw extends through the speed adjustment spring and the spring fixture dish. A hinge cover is coaxially connected to each blade handle axis. The other end of the adjustment screw is screwedly connected with the hinge cover. An end of the speed adjustment spring is fixedly connected with the spring push plate. The other end of the speed adjustment spring is fixedly connected with the spring fixture dish.

A baffle is integrally configured at a front end of the hinge cover, and a plurality of through holes are configured on the spring fixture dish. The adjustment screw extends through the through holes and the baffle and is screwedly connected with the hinge cover. The diameter of the baffle is greater than the diameter of the through holes. The diameter of the through holes is greater than the diameter of the adjustment screw.

The angle between the axis of each speed adjustment rod and the axis of each blade handle axis in the projection plane of the speed adjustment rod is 50 degrees.

A blade handle is fixedly disposed on each blade handle axis, and the blade is fixedly connected to the blade handle. One of the speed adjustment rods is fixedly disposed on the blade handle.

The quantity of the blade handle bases is three.

A wind guiding cover is fixedly covering the turbine shell and configured for protecting the blade pitch changing unit from being damaged by the wind and rain.

Compared with the conventional technologies, the advantage of the present patent application is that because the blade pitch changing unit is configured on the turbine shell, when the rotation speed of the wind turbine exceeds the rated rotation speed, by the working of the blade pitch changing unit, the rotation speed of the wind turbine is adjusted so that it will not increase by a large amount due to an increase of the wind speed. As a result, it is ensured that the wind turbine will work stably under the preset rated wind speed and the blades, the generator and the control system of the wind power electrical generator are protected from the being damaged by the high wind speed. In the meanwhile, the wind speed range compatible with the wind power electrical generator is made relatively wide. Because a baffle is disposed at the front end of the hinge cover, when the spring is releasing pressure, the baffle may prevent the blade handle axis from being excessively reset so as to ensure an higher precision of the reset angle of the blade handle axis (the blade), and to enable the blade pitch changing unit to control the rotation speed of the wind turbine more precisely. In addition, the whole apparatus has a simple structure and is easy to manufacture.

BRIEF DESCRIPTIONS OF THE DRAWINGS

DETAILED DESCRIPTION

Figure 1:
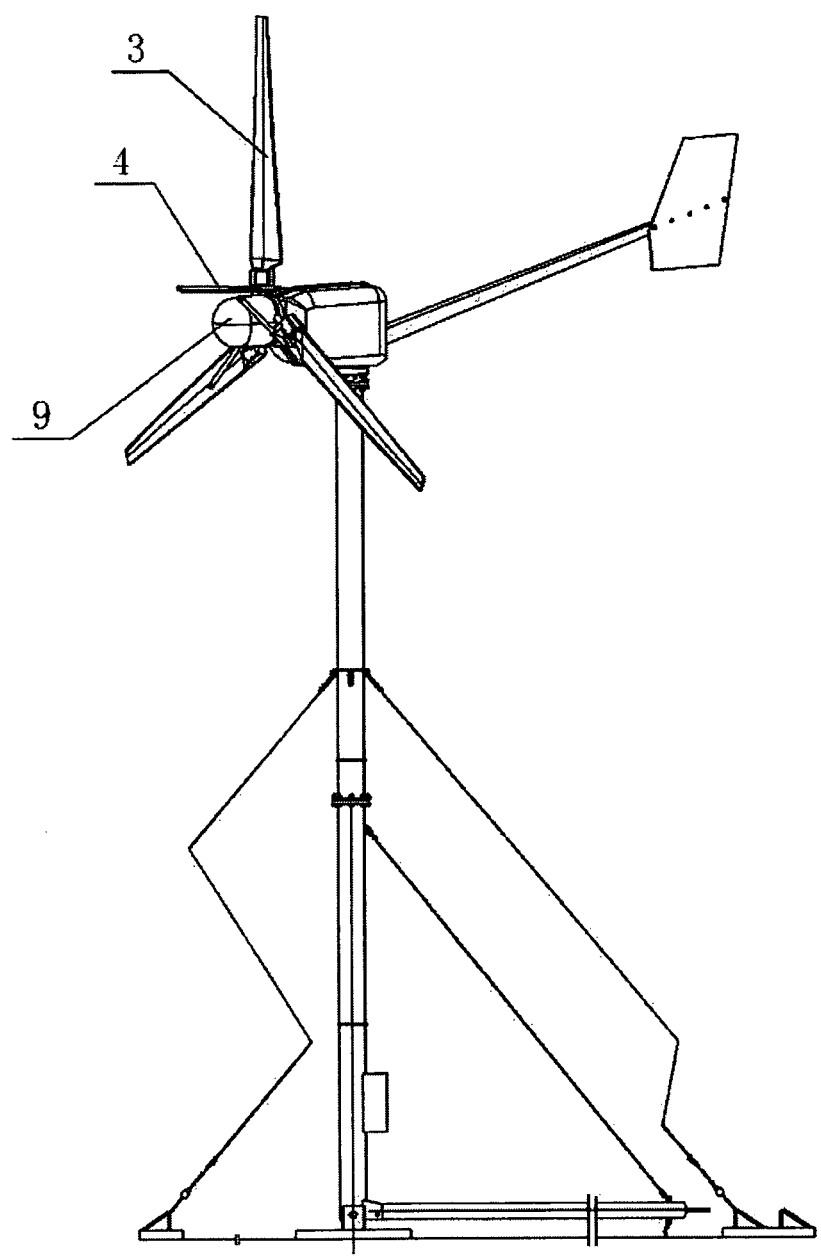
FIG. 1 illustrates how the present patent application is installed onto a wind power electrical generator.
Figure 2:
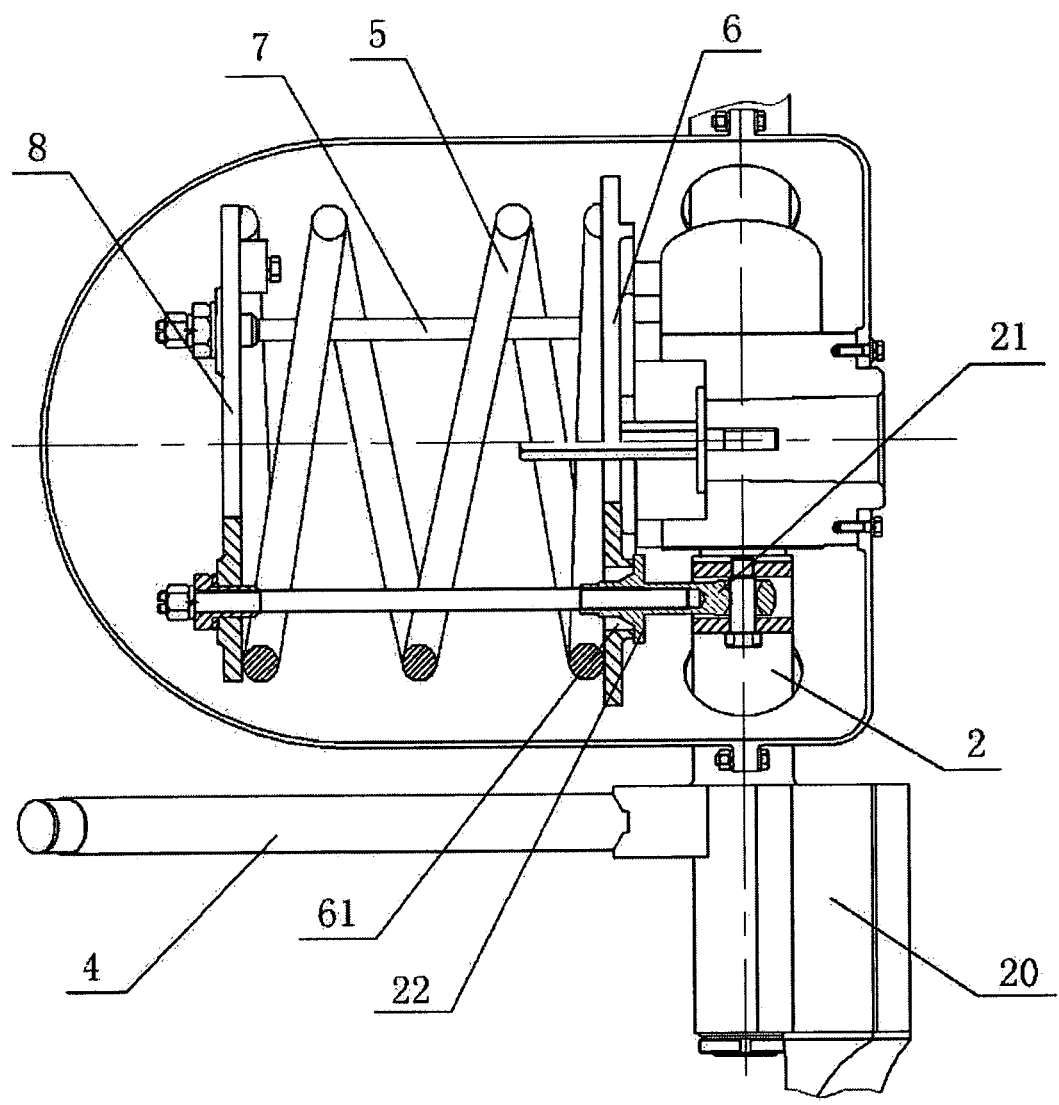
FIG. 2 is a first diagram illustrating the structure of the present patent application.
Figure 3:
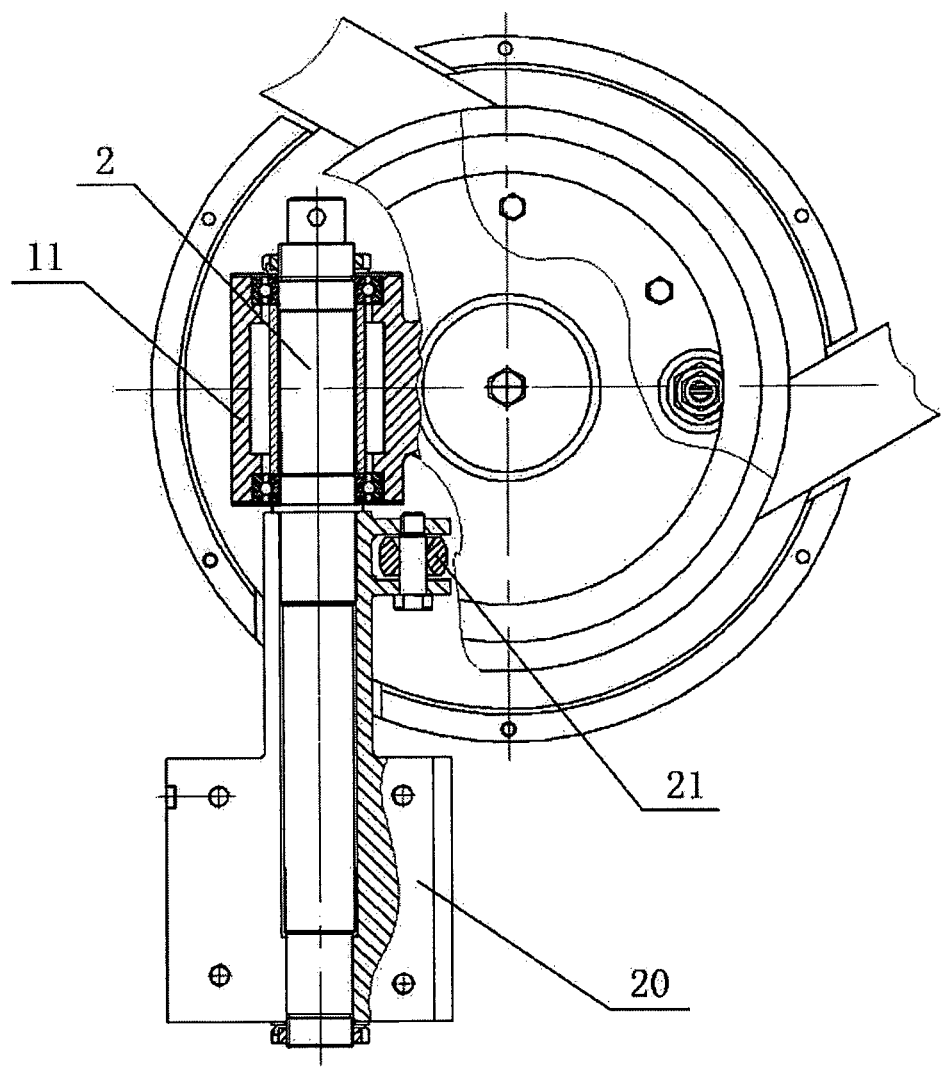
FIG. 3 is a second diagram illustrating the structure of the present patent application.
Figure 4:
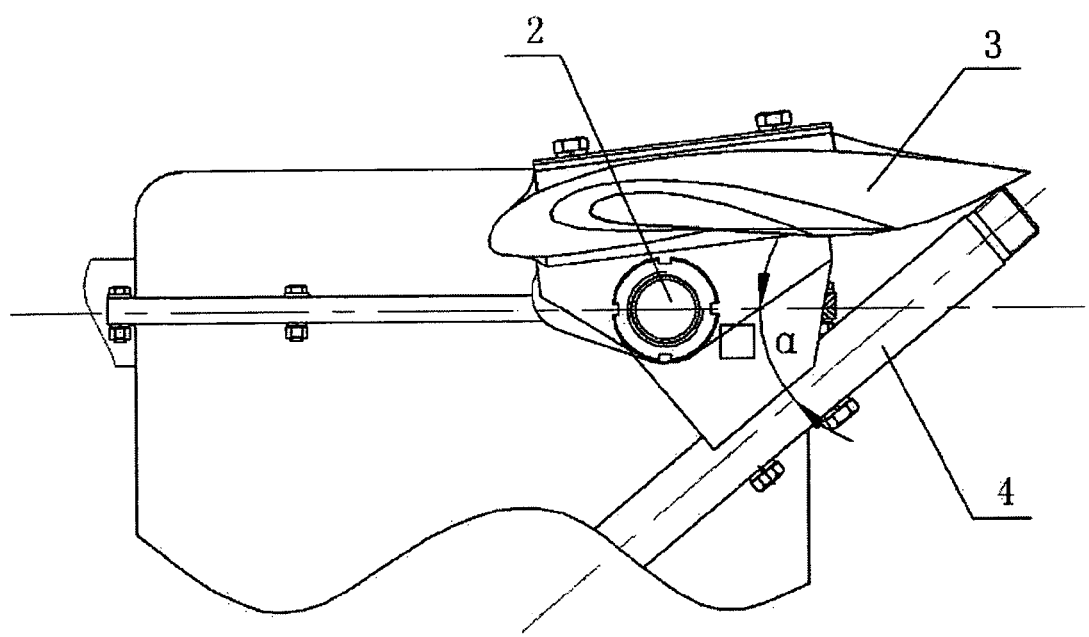
FIG. 4 is a third diagram illustrating the structure of the present patent application.
Figure 5:
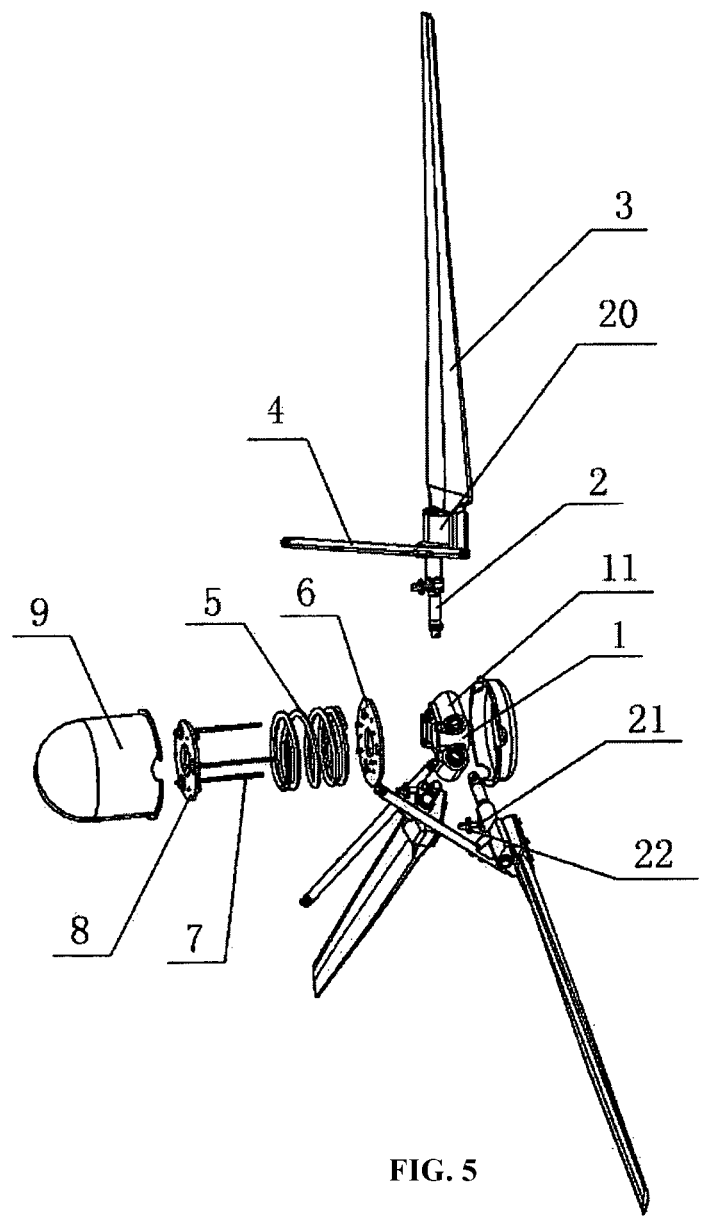
FIG. 5 is an exploded view of the present patent application.

Reference will now be made in detail to a preferred embodiment of the wind turbine with variable blade pitch for a wind power electrical generator disclosed in the present patent application, examples of which are also provided in the following description. Exemplary embodiments of the wind turbine with variable blade pitch for a wind power electrical generator disclosed in the present patent application are described in detail, although it will be apparent to those skilled in the relevant art that some features that are not particularly important to an understanding of the wind turbine with variable blade pitch for a wind power electrical generator may not be shown for the sake of clarity.

Furthermore, it should be understood that the wind turbine with variable blade pitch for a wind power electrical generator disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Referring to the figures, a wind turbine with variable blade pitch for a wind power electrical generator includes a plurality of speed adjustment rods 4, a speed adjustment spring 5, a plurality of adjustment screws 7, a turbine shell 1 coaxially disposed at a turbine axis, and three evenly distributed blade handle bases 11 fixedly disposed at the outer circumference of the turbine shell 1. A blade handle axis 2 is coaxially configured on each blade handle base through a bearing. A blade handle 20 is fixedly disposed on each blade handle axis 2. A blade 3 is fixedly connected to the blade handle 20 through a bolt. The speed adjustment rod 4 is fixedly disposed on the blade handle 20 through a bolt. The angle α between the axis of each speed adjustment rod 4 and the axis of each blade handle axis 2 in the projection plane of the speed adjustment rod 4 is 50 degrees. The center of gravity of each speed adjustment rod 4 is deviated from the center of the axis of each blade handle axis 2. A spring fixture dish 6 is fixedly disposed on the turbine shell 1 through a bolt. A plurality of through holes 61 are configured on the spring fixture dish 6. The quantity of the adjustment screws 7 is equal to the quantity of the blade handle axes 2. Each adjustment screw 7 corresponds to a blade handle axis 2. A spring push plate 8 is fixedly disposed at an end of the adjustment screw 7. The other end of the adjustment screw 7 extends through the speed adjustment spring 5 and the through holes 61 of the spring fixture dish 6. A hinge cover 21 is coaxially connected to each blade handle axis 2. A baffle 22 is integrally configured at a front end of the hinge cover 21. The other end of the adjustment screw 7 extends through the baffle 22 and screwedly connected with the hinge cover 21. The diameter of the baffle 22 is greater than the diameter of the through holes 61. The diameter of the through holes 61 is greater than the diameter of the adjustment screw 7. An end of the speed adjustment spring 5 is fixedly connected with the spring push plate 8. The other end of the speed adjustment spring 5 is fixedly connected with the spring fixture dish 6. A wind guiding cover 9 is fixedly covering the turbine shell 1.

The working principle of the above-mentioned wind turbine is the following. When the blades 3 rotate around the turbine axis, the blades 3 also rotate around the center axes of the blade handle axes 2. When the wind speed becomes greater and the turbine is rotating at a speed that exceeds the rated rotation speed, because the center of gravity of the speed adjustment rod 4 deviates from the center of axis of the blade handle axis 2, upon the centrifugal force of the speed adjustment rod 4, the blade handle axis 2 will rotate counterclockwisely and in the meanwhile pull the adjustment screw 7 to compress the speed adjustment spring 5, so that the angle between the turning curves of the blade elements of the blades 3 and the rotation plane (i.e. the blade angle) becomes smaller, which causes the angle of attack between the air flow and the blade elements to become greater. When the angle of attack exceeds the threshold angle of attack of the blades 3, the air flows at the surface of the blades 3 start to separate, forming a stalled situation. The resistance force will increase and the elevation force will decrease, which makes the efficiency of the wind turbine lower, the work done by the wind turbine smaller, and the rotation speed lower. On the other hand, when the wind speed is smaller, the speed adjustment spring 5 is back to its original position and forces the blades 3 to operate back at the original rated blade angle, thereby realizing the wind turbine stably operating at the preset rated wind speed.

In the above embodiment, the number of the blades, according to the actual requirements, may be increased to 4, 5 and so on, but may not be less than 3. The angle α between the axis of the speed adjustment rod 4 and the axis of the blade handle axis 2 in the projection plane of the speed adjustment rod 4 may be determined according to the actual design requirements, and not limited to 50 degrees.

While the present patent application has been shown and described with particular references to a number of embodiments thereof, it should be noted that various other changes or modifications may be made without departing from the scope of the present invention.

What is claimed is:

1. A wind turbine with variable blade pitch for a wind power electrical generator comprising:
   a turbine shell coaxially disposed at a turbine axis;
   at least three evenly distributed blade handle bases fixedly disposed at an outer circumference of the turbine shell,
   a blade handle axis being coaxially configured on each blade handle base, and
   a blade being fixedly disposed on each blade handle axis;
   wherein:
   a centrifugal blade pitch changing unit is disposed on the turbine shell and configured to adjust a rotation speed of the wind turbine; and
   wherein the centrifugal blade pitch changing unit comprises a plurality of speed adjustment rods, a speed adjustment spring, and a plurality of adjustment screws, a quantity of the adjustment screws corresponds to a quantity of the blade handle axes, the speed adjustment rods are fixedly disposed on the blade handle axes by a certain angle, a center of gravity of each speed adjustment rod is deviated from a center of an axis of each blade handle axis, a spring fixture dish is fixedly disposed on the turbine shell, a spring push plate is fixedly disposed at an end of the adjustment screws, another end of the adjustment screws extends through the speed adjustment spring and the spring fixture dish, a hinge cover is coaxially connected to each blade handle axis, another end of the adjustment screws are screwedly connected with the hinge cover, an end of the speed adjustment spring is fixedly connected with the spring push plate, another end of the speed adjustment spring is fixedly connected with the spring fixture dish.

2. The wind turbine with variable blade pitch for a wind power electrical generator of claim 1, wherein a baffle is integrally configured at a front end of the hinge cover, and a plurality of through holes are configured on the spring fixture dish, the adjustment screws extend through the through holes and the baffle and are screwedly connected with the hinge cover, a diameter of the baffle is greater than a diameter of the through holes, the diameter of the through holes is greater than a diameter of the adjustment screws.

3. The wind turbine with variable blade pitch for a wind power electrical generator of claim 1, wherein an angle between an axis of each speed adjustment rod and the axis of each blade handle axis in a projection plane of the speed adjustment rod is 50 degrees.

4. The wind turbine with variable blade pitch for a wind power electrical generator of claim 1, wherein a blade handle is fixedly disposed on each blade handle axis, and the blade is fixedly connected to the blade handle, one of the speed adjustment rods are fixedly disposed on the blade handle.

5. The wind turbine with variable blade pitch for a wind power electrical generator of claim 1, wherein a quantity of the blade handle bases is three.

6. The wind turbine with variable blade pitch for a wind power electrical generator of claim 1, wherein a wind guiding cover is fixedly covering the turbine shell.

* * * * *